United States Patent [19]
Gennesseaux

[11] Patent Number: 5,297,781
[45] Date of Patent: Mar. 29, 1994

[54] HYDRAULIC ANTI-VIBRATION DEVICES

[75] Inventor: André Gennesseaux, Chalette Sur Loing, France

[73] Assignee: Hutchinson, Paris, France

[21] Appl. No.: 34,519

[22] Filed: Mar. 18, 1993

[30] Foreign Application Priority Data

Mar. 20, 1992 [FR] France ............... 92 03392

[51] Int. Cl.⁵ .................................. F16M 1/00
[52] U.S. Cl. .................. 267/140.14; 267/140.15; 267/219
[58] Field of Search .......... 267/140.14, 140.15, 267/219; 248/562, 636, 638; 188/267, 269

[56] References Cited

U.S. PATENT DOCUMENTS

| | | | |
|---|---|---|---|
| 4,650,170 | 3/1987 | Fukushima | 267/140.15 |
| 4,802,648 | 2/1989 | Decker et al. | 267/190.15 |
| 4,877,225 | 10/1989 | Noguchi et al. | 267/140.14 |
| 5,116,029 | 5/1992 | Gennesseaux | 267/219 |

FOREIGN PATENT DOCUMENTS 0440536 7/1991 European Pat. Off. .
2164416 3/1986 United Kingdom .

*Primary Examiner*—Robert J. Oberleitner
*Assistant Examiner*—Chris Schwartz
*Attorney, Agent, or Firm*—Larson and Taylor

[57] ABSTRACT

A hydraulic anti-vibration support includes a rigid frame 3, a head 1, a frustoconical elastomer wall 6 connecting the cylinder to the head, a membrane 7 carried by the cylinder, a partition 8 separating the inside of the resulting liquid-filled enclosure into a working chamber A and a compensating chamber B, a throttled passage 9 interconnecting the two chambers, a small displacement piston 12, and an electrical exciter 14 suitable for setting up counter-vibrations in the piston. An air-filled capsule 19 defined by the piston and by a rigid wall 20 secured to the frame by a slotted spacer 21 is immersed in the working chamber, the piston being disposed between the wall and the exciter, and the periphery of the piston being connected to the wall by a sealed and deformable annular gasket 23.

10 Claims, 2 Drawing Sheets

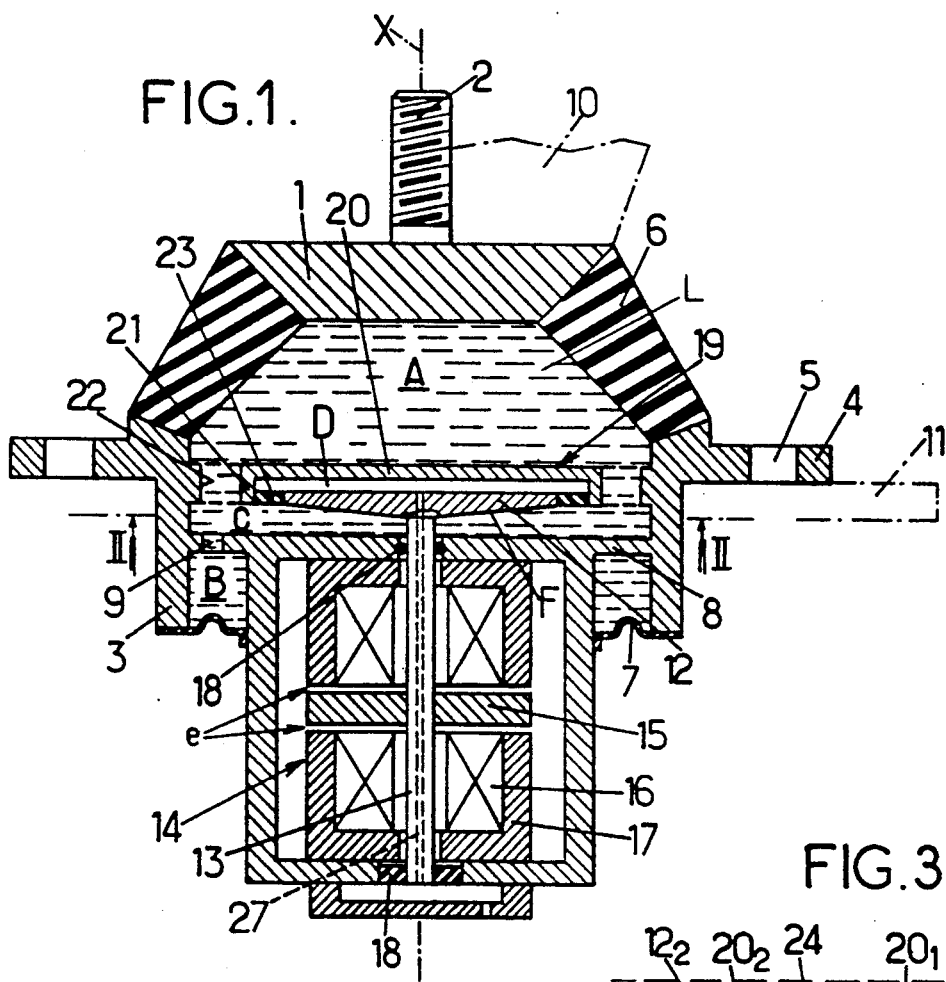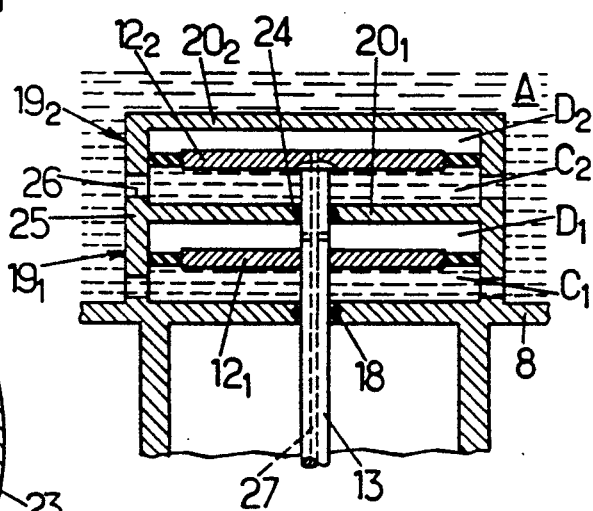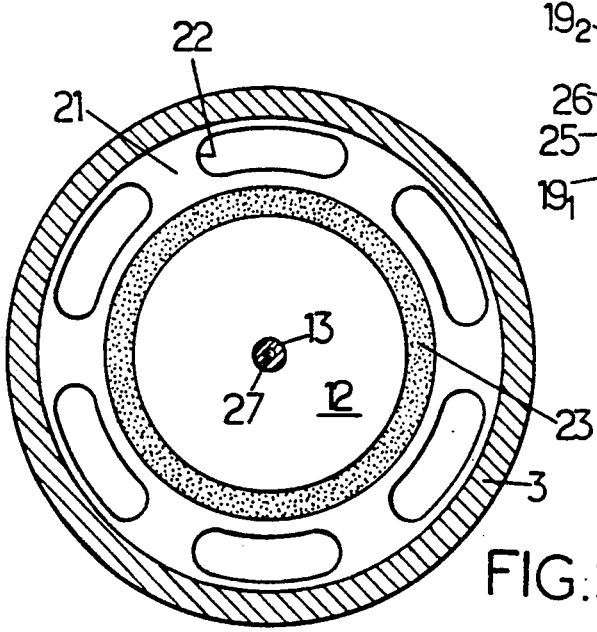

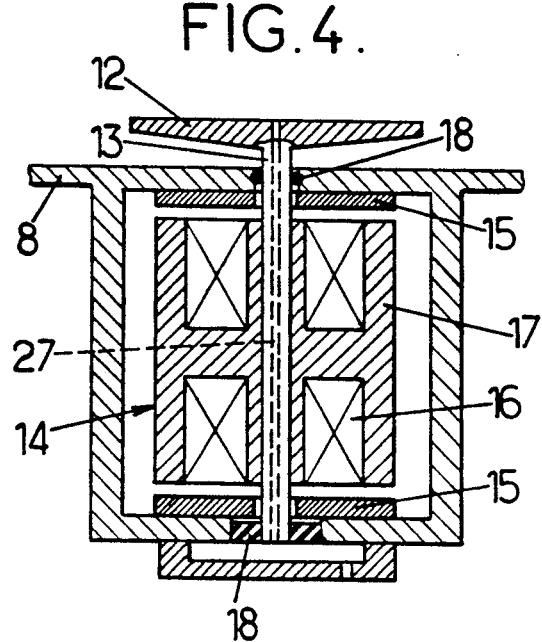
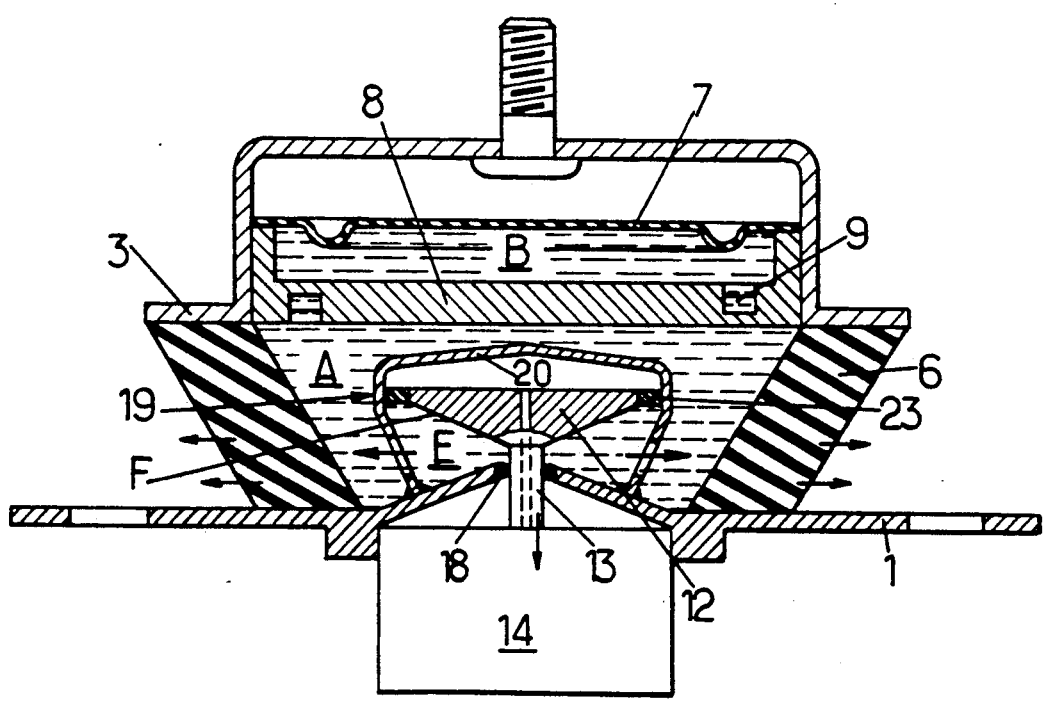

HYDRAULIC ANTI-VIBRATION DEVICES

The invention relates to hydraulic anti-vibration devices for damping and connection or even support purposes between two rigid elements such as a vehicle chassis and the motor of the vehicle.

More particularly, amongst such devices, the invention relates to those that are generally in the form of a box and that comprise:

rigid annular frame suitable for securing to one of the two elements to be interconnected;

a rigid head suitable for securing to the other element;

an annular elastomer wall providing good resistance to axial compression and interconnecting the frame and the head in a sealed manner;

a sealed flexible membrane carried by the frame and co-operating with the frame, with the wall, and with the head to define a sealed enclosure;

a rigid and sealed partition carried by the frame inside the enclosure and dividing the enclosure into a working chamber adjacent to the wall, and a compensation chamber adjacent to the membrane;

a throttled passage, preferably formed in the rigid partition, putting the two chambers permanently into communication with each other;

a mass of liquid filling the two chambers and the throttled passage;

a rigid piston mounted on one of the two pieces constituted by the frame and by the head - which piece is referred to below as the "first piece" or "first part", so as to be capable of moving with limited amplitude relative to the first piece; and an electrical exciter member mounted on the first piece and suitable for applying reciprocating forces on the piston tending to attenuate the vibrations transmitted from the second piece to the first piece.

As is known, with such a device:

oscillations of relatively large amplitude (namely greater than 0.5 mm) and of relatively low frequency (namely of the order of 5 Hz to 15 Hz) such as those due to "choppiness" imparted to the vehicle by a "choppy" road have the effect of causing liquid to flow from one of the two chambers into the other and back again through the throttled passage, putting the mass of liquid moved in this way into resonance when the frequency of the oscillations reaches a predetermined value which is a function of the ratio between the axial length and the cross-section of the throttled passage, such resonance providing excellent damping of the oscillations concerned;

vibrations of relatively small amplitude (less than 0.5 mm) and of relatively high frequency (generally in the range 20 Hz to 200 Hz), such as those due to the operation of the engine give rise to "natural" vibrations of the piston that may attenuate or filter transmission of the corresponding vibrations; and the application of electrical attenuation forces on the piston is performed in such a manner that the forces subject the piston to artificial "counter-vibrations" that are phase shifted relative to the natural vibrations thereof and that tend to permanently suppress any vibration at the first part: this vibration filtering or attenuating effect is sometimes referred to as "active attenuation".

In known embodiments of devices of this kind, when it is desired to reduce the volume of the working chamber to increase the hydraulic pressure that subsists therein, the piston is urged by the exciter member in a direction that tends to "raise" the moving masses of the device, i.e. in a direction such that the center of gravity of the moving masses is displaced upwards: which direction corresponds to the piston itself moving upwards if the axis of the device is vertical with the head of the device uppermost, and providing the first part is constituted by the frame of the device.

Under such conditions, if the overall force applied to the first part by each displacement of the piston due to electrical excitation is taken into consideration, which force makes use both of the hydraulic pressure force H developed for pushing back the liquid and the inertia force I due to the moving masses, it can be seen that the force I must always be subtracted from the force H.

Consequently, when the two forces H and I are equal, which happens at some given value $f_0$ of the oscillation frequency imposed to the piston, the resultant thereof is zero.

In other words, at said frequency value $f_0$, zero efficiency is observed at the first part:

no active attenuation in the above-defined meaning can then be performed by using the exciter on the cylinder.

For devices of the kind in question having a vertical axis and having the head disposed on top, with the first part being the frame, things take place differently at the head: in such a device, attenuation can be made possible and efficient even at the above-defined frequency $f_0$, by choosing as the rigid element in which the vibrations are to be suppressed that element which is secured to the head of the shock absorber and not the element which is secured to its frame.

However, in the more general case of constructions as described above, it is the opposite which is observed, the rigid element in which vibrations are to be suppressed is generally the bodywork of the vehicle which is secured to the frame.

Such a situation may present a severe drawback.

Thus, if it is desired on a given vehicle to replace a conventional support in which the portion to be protected from vibration by means of an improved anti-vibration support of the above kind, is the frame, then it is necessary to turn the improved support "upside-down" and to develop new connections.

An object of the present invention is to remedy the above drawback by reversing the displacement direction of the moving piston so as to change the sign of the inertia term due to displacement of the piston.

As a result, the inertia force I of the piston is added to the hydraulic pressure force H instead of being subtracted therefrom, and there is no longer an efficiency null.

To obtain this result, the piston is organized and mounted in such a manner that the hydraulic pressure in the working chamber increases for a displacement of the piston that causes the center of gravity of the moving masses to be displaced downwards rather than upwards.

More precisely, according to the invention, a hydraulic anti-vibration device of the kind in question is essentially characterized in that it comprises, immersed in the working chamber, a sealed capsule filled with air and essentially defined by a rigid wall secured to the first piece and by the piston itself, the periphery thereof being connected to the rigid wall by means of a deformable sealed annular gasket, the piston being disposed axially between the rigid wall and the exciter member with a liquid-filled space forming a portion of the working chamber being interposed therebetween.

In preferred embodiments, use may also be made of one and/or another of the following dispositions:

the capsule is connected to the outside atmosphere;

the rigid wall of the capsule includes a central solid portion surrounded by a perforated rigid annular spacer secured to the first piece and the annular connection zone between the central portion and the spacer is connected in sealed manner to the periphery of the piston, which is itself then constituted by a solid rigid plate;

the annular spacer is a flat washer;

the annular spacer is a cylindrical ring;

the device includes at least one other capsule disposed between the first capsule and the exciter member with a liquid-filled space forming a portion of the working chamber being interposed therebetween, each other capsule being defined by another rigid wall secured to the first piece and by another piston secured to the first piston, the periphery thereof being connected to the other rigid wall by means of another sealed and deformable annular gasket, the other piston being disposed axially between the other rigid wall and the exciter member, with a liquid-filled space forming a portion of the working chamber being interposed therebetween;

the electrical exciter member is of a variable reluctance electromagnetic type and the piston is secured to relatively heavy portions of the magnetic circuits constituting the exciter, which portions include, in particular, electrical excitation coils;

the piston is disposed above the exciter member and the bottom face of the piston that is in contact with the liquid of the working chamber is generally frustoconical in shape, converging downwards;

the base of the annular elastic wall extends down further than the piston;

the electrical exciter member is housed in the capsule.

In addition to the above main dispositions, the invention includes other dispositions which are preferably used simultaneously therewith and which are described in greater detail below.

Reference is made below to various preferred embodiments of the invention described with reference to the accompanying drawings given, naturally, by way of non-limiting example.

FIGS. 1 and 2 are respectively an axial section and a fragmentary cross-section on II—II of FIG. 1 through a hydraulic anti-vibration support implemented in accordance with the invention.

FIG. 3 is a fragmentary axial section through a variant of such a support that is also in accordance with the invention.

FIG. 4 is similar to FIG. 1 and shows a variant of a portion of the support of FIG. 1, still in accordance with the invention.

FIG. 5 is an axial section through another variant of such a support in accordance with the invention.

In conventional manner, the support in question and shown diagrammatically in FIGS. 1 and 2 comprises:

a rigid head 1 constituted by a central tab that is extended upwards by a waiting fixing stud 2;

a rigid ring 3 extended outwardly by two lugs 4 themselves perforated by respective fixing holes 5;

a thick frustoconical wall 6 made of rubber that flares downwardly and that provides good resistance to axial compression so as to act as a "support", the wall connecting the ring 3 to the head 1 in sealed manner;

a flexible thin bellows 7 connected in sealed manner to the ring 3 and co-operating with the ring, the wall 6, and the head 1 to define a closed box;

a rigid partition 8 dividing the box into two chambers, namely a working chamber A adjacent to the wall 6 and a compensation chamber B adjacent to the bellows 7;

a throttled passage 9 interconnecting the two chambers A and B, which passage is formed, in this case, by being hollowed out in the periphery of the partition 8; and a mass of liquid L filling the two chambers and the throttled passage.

The support assembly is circularly symmetrical or substantially circularly about an axis X, the rigid head 1 supports an internal combustion engine 10 of the vehicle while the rigid ring 3 is mounted on the chassis 11 of the vehicle.

As is well known, oscillations of relatively low frequency and of large amplitude when applied between the ring 3 and the head 1 give rise to same-frequency reciprocating displacement of the liquid L from one of the two compartments A and B into the other and back again through the passage 9, and the oscillating liquid contained in the passage is the seat of a resonance phenomenon when the said frequency reaches a predetermined value that depends on the dimensions of the passage, which phenomenon has the effect of damping the transmission of the original oscillations between the head and the ring.

In a manner that is also known per se, the support in question also includes a piston 12 having one face F immersed in the working chamber A, which piston is secured to the moving member or "rod" 13 of an electrical exciter 14.

The exciter is designed to exert "active attenuation" on the piston 12 as defined above, and to this end it comprises:

a preferably laminated ferromagnetic element 15 secured to the moving element 13 and constituted in this case by a rod about the axis X;

electrical coil means 16 connected to appropriate excitation circuits (not shown) and mounted in a housing 17 secured to the partition 8 so as to set up a magnetic circuit that is closed through the element 15 and through narrow air gaps e; and means such as sealing gaskets 18 interposed between the rod 13 and appropriate bearings, to make it possible for the rod to move axially while nevertheless isolating the ferromagnetic element 15 from the liquid L.

In presently known embodiments of supports of the kind described above, that face of the piston actuatable by the exciter which comes into contact with the liquid is its top face (see document U.S. Pat. No. 5,116,029).

It must therefore be raised to compress the liquid contained in the working chamber, and while the piston is being raised it takes some of the liquid upwards with it.

Under such conditions, the overall force applied to the ring 3 by any forced displacement of the piston due to the exciter can be considered as being the difference between the hydraulic force H due to compression of the liquid and the inertia force I of the moving masses (piston, equipment connected to the piston, and liquid driven thereby).

The inertia force I depends on the oscillation frequency of the piston, and at some given value $f_0$ of the frequency, the two forces H and I are equal.

In other words, at the frequency $f_0$, even though the piston continues to move, the resultants of the forces due to displacement of the piston on the cylinder 3 are nil, and it is no longer possible to exert effective active attenuation.

According to the invention, this drawback is avoided by reversing the displacement direction of the center of gravity of the moving masses so as to change the sign of the inertia force. As a result, the inertia force is added to the hydraulic pressure force instead of being subtracted therefrom, and there is no longer a null in effectiveness.

In the present embodiment, the hydraulic pressure in the working chamber must therefore increase when the piston moves downwards, instead of increasing when it moves upwards.

To this end, as can clearly be seen in FIG. 1, the piston 12 is still mounted at the top end of the rod 13, but its face F in contact with the liquid L in the working chamber A is now its bottom face.

To obtain such an assembly, a sealed capsule 19 is used that is filled with air and that is immersed in the working chamber A, the top of the capsule being defined by a rigid horizontal wall 20 and the bottom thereof being defined by the piston 12 itself, which piston is disposed between the wall 20 and the exciter 14, with an annular gap C being interposed therebetween that forms a portion of the working chamber A and that is filled with liquid.

The wall 20 is in the form of a solid disk secured to the cylinder 3 by means of appropriate arms or by means of a peripheral washer 21 hollowed out by a ring of bean-shaped slots 22.

The various orifices 22, or other such orifices, formed through the periphery of the wall 20 provide a section that is sufficiently large to ensure that communication between the space C and the upper volume constituting the essential portion of the chamber A is free.

The piston 12 is itself constituted by a circular plate whose periphery is connected in sealed manner to the wall 20, in particular at the washer 21, by means of a flexible annular gasket 23.

If the inside volume of the pocket D inside the capsule 19 is small, as is the case in the embodiment shown, it is advantageously open to the atmosphere via a channel 27 formed, for example, through the rod 13 as shown, or else successively through the fixed wall of the capsule 19 and through its surroundings; this precaution prevents displacements of the piston setting up pressure variations in the volume of air contained in the pocket D that could spoil operation thereof.

With such an embodiment, as can clearly be seen in FIG. 1, the displacements of the piston that give rise to an increase in the hydraulic pressure within the chamber A are displacements that extend downwards.

Under such conditions, any artificial urging of the piston 12 in a downwards direction tends to increase the hydraulic pressure within the chamber A, which pressure is applied against the ring 3, and the inertia force I due to the moving masses is thus added to the hydraulic force H instead of being subtracted therefrom, as in prior art embodiments.

There is thus no longer an effectiveness null: it is possible to generate effective active attenuation for counter-vibrations of any frequency imposed on the piston.

This beneficial effect can be increased by increasing the number of air-filled sealed capsules 19.

In the embodiment shown diagrammatically in FIG. 3, two such superposed capsules $19_1$ and $19_2$ are provided, respectively defined by a top rigid wall $20_1$, $20_2$ secured to the cylinder 3 and by a bottom piston $12_1$, $12_2$ secured to the rod 13 of the electrical actuator 14 and connected to the corresponding rigid wall by a sealed annular gasket.

Each piston upwardly defines a space $C_1$, $C_2$ filled with liquid and in free communication with the top main portion of the chamber A: to this end, the two disk-shaped rigid walls $20_1$ and $20_2$ are connected to the partition 8 by means of a cylindrical skirt 25 perforated by large holes 26.

The rod 13 passes through the top wall $20_1$ of the lower capsule $19_1$ in sealed manner by means of a sealing ring 24.

Pockets $D_1$ and $D_2$ inside the two capsules are both connected to the outside atmosphere via a channel 27 formed axially along the rod 13.

In such an embodiment, any downwards displacement of the rod 13 gives rise to common thrust of the two pistons $12_1$ and $12_2$ on the liquid contained in the spaces $C_1$ and $C_2$, i.e., in the end, on the liquid contained in the working chamber A.

As explained above, in the above-described embodiments, that portion of the overall force applied to the ring 3 by each displacement of the piston 12 which is due to the inertia of the moving masses no longer constitutes a drawback that could lead to zero effectiveness.

It is thus quite possible to consider reinforcing the inertia component.

The variant shown in FIG. 4 enables such reinforcement to be obtained without making the support any heavier.

In this variant, not only is a ferromagnetic element serving to close a magnetic circuit such as the element referenced 15 in FIG. 1 secured to the rod 13 of the piston 12, but a significant portion of the circuit is also secured thereto, essentially comprising the housing 17 and even the electrical excitation coils 16: under such circumstances, it is the relatively lightweight ferromagnetic elements 15 that serve to close the magnetic circuit which are fixed and secured to the ring 3, or more specifically to the partition 8.

In the variant shown in FIG. 5, the exciter member 14 and the piston 12 are mounted on the head 1 of the device instead of being mounted on the ring 3: under such circumstances, the assembly is upsidedown relative to the above-described assembly in that the head 1 is now at the bottom and the ring 3 at the top of the device, with the still frustoconical annular wall 6 now flaring upwards.

There can be seen the capsule 19 filled with air and defined by a rigid top wall 20 secured to the head 1 and by the piston 12 which is still disposed beneath the wall 20 and which is connected thereto via a flexible sealed peripheral gasket 23.

In addition, the bottom face F of the piston 22 is frustoconical in shape, converging downwards, and the base of the working chamber A is defined by a frustoconical top face that converges upwards, such that the two facing faces delimit between them an annular space E that diverges radially outwards, and the small base of the annular wall 6 is level with said space E.

As a result, radial displacements of the liquid contained in the space E, due to vertical displacements of the piston 22 are facilitated, and they give rise, in the end, to horizontal deformations of the base of the wall 6.

In other words, when the piston 12 moves downwards, liquid is no longer urged upwards into the working chamber A, and the performance of the device is thus improved: even if the mass of the volume of displaced liquid is smaller than that of the moving equipment (piston and rod), it is preferable that the former should not be subtracted from the latter in the overall estimate of the "moving masses" subjected to vertical displacement.

Naturally, this advantage due to the fact that the base of the annular wall 6 extends below the piston could also be obtained in the embodiment shown in FIG. 1 by reorganizing the device accordingly.

As a result, regardless of the embodiment used, a hydraulic anti-vibration device is obtained whose structure and operation can be understood sufficiently from the above description.

The device presents a certain number of advantages over those known in the past, and in particular the advantage of making active attenuation possible at any frequency, using anti-vibration devices mounted in the same direction as comparable conventional devices.

Naturally, and as can also be seen from the above, the invention is not limited in any way to the particular applications and embodiments described more particularly; on the contrary, the invention extends to any variants, and in particular to any variant in which the exciter 14 is itself received inside a capsule (19, $19_1$, $19_2$) instead of being mounted outside the capsule, as it is in the embodiments shown in the drawings.

I claim:

1. A hydraulic anti-vibration device which is placed between two rigid elements comprising:
   a rigid annular frame which is secured to one of the two elements;
   a rigid head which is secured to the other of the two elements;
   an annular elastomer wall having a good resistance to axial compression which interconnects said frame and said head in a sealed manner;
   a sealed flexible membrane which is carried by said frame and which cooperates with said frame, said wall and said head to define a sealed enclosure;
   a rigid partition which is carried by said frame inside of said sealed enclosure and which divides said sealed enclosure into a working chamber adjacent said wall and a compensation chamber adjacent said membrane;
   a throttled passage providing permanent communication between said working chamber and said compensation chamber;
   a mass of liquid filling said passage, said working chamber and said compensation chamber;
   a rigid piston mounted on one of said frame and said head which is capable of moving with limited amplitude relative to said one of said frame and said head, said piston including a periphery;
   an electrical exciter member mounted on said one of said frame and said head which applies a reciprocating force on said piston tending to attenuate vibrations transmitted from the other of said frame and said head to said one of said frame and said head;
   a sealed capsule immersed in said working chamber and filled with air, said capsule including (a) a rigid wall secured to said one of said frame and said head and (b) a deformable sealed annular gasket securing said periphery of said piston to said rigid wall axially between said rigid wall and said exciter member such that the air is located between said piston and said rigid wall; and
   a liquid-filled space forming part of said working chamber interposed between said piston and said exciter member.

2. An anti-vibration device as claimed in claim 1,
   wherein said rigid piston is a solid plate;
   wherein said rigid wall of said capsule includes a central solid portion and a perforated rigid annular spacer surrounding said central portion which said annular spacer is attached to said one of said frame and said head; and
   wherein said annular gasket secures the periphery of said piston to said annular spacer.

3. An anti-vibration device as claimed in claim 2 wherein said annular spacer is a flat washer.

4. An anti-vibration device as claimed in claim 2 wherein said annular spacer is a cylindrical ring.

5. An anti-vibration device as claimed in claim 1 and further including a connection from the air in said capsule to outside atmosphere.

6. An anti-vibration device as claimed in claim 1 and further including:
   a second position having a periphery and being mounted to said first-mentioned piston so as to be between said first-mentioned piston and said exciter member;
   a second capsule which is immersed in said working chamber and filled with air, said second capsule being provided between said first-mentioned capsule and said exciter member and including (a) a second rigid wall secured to said one of said frame and said head and (b) a second deformable sealed annular gasket securing said periphery of said second piston to said second rigid wall axially between said second rigid wall and said exciter member such that the air is located between said second piston and said second rigid wall; and
   a second liquid-filled space forming part of said working chamber interposed between said second piston and said exciter member.

7. An anti-vibration device as claimed in claim 1 wherein said exciter member is of a variable reluctance electromagnetic type having electrical excitation coils, and wherein said piston is secured to said excitation coils.

8. An anti-vibration device as claimed in claim 1 wherein said piston includes a face in contact with said liquid which is frustoconically shaped with a divergence toward said exciter member.

9. An anti-vibration device as claimed in claim 1 wherein said annular wall includes a base which is axially disposed between said piston and said one of said frame and said head.

10. An anti-vibration device as claimed in claim 1 wherein said exciter member is located in said capsule.

* * * * *